UNITED STATES PATENT OFFICE.

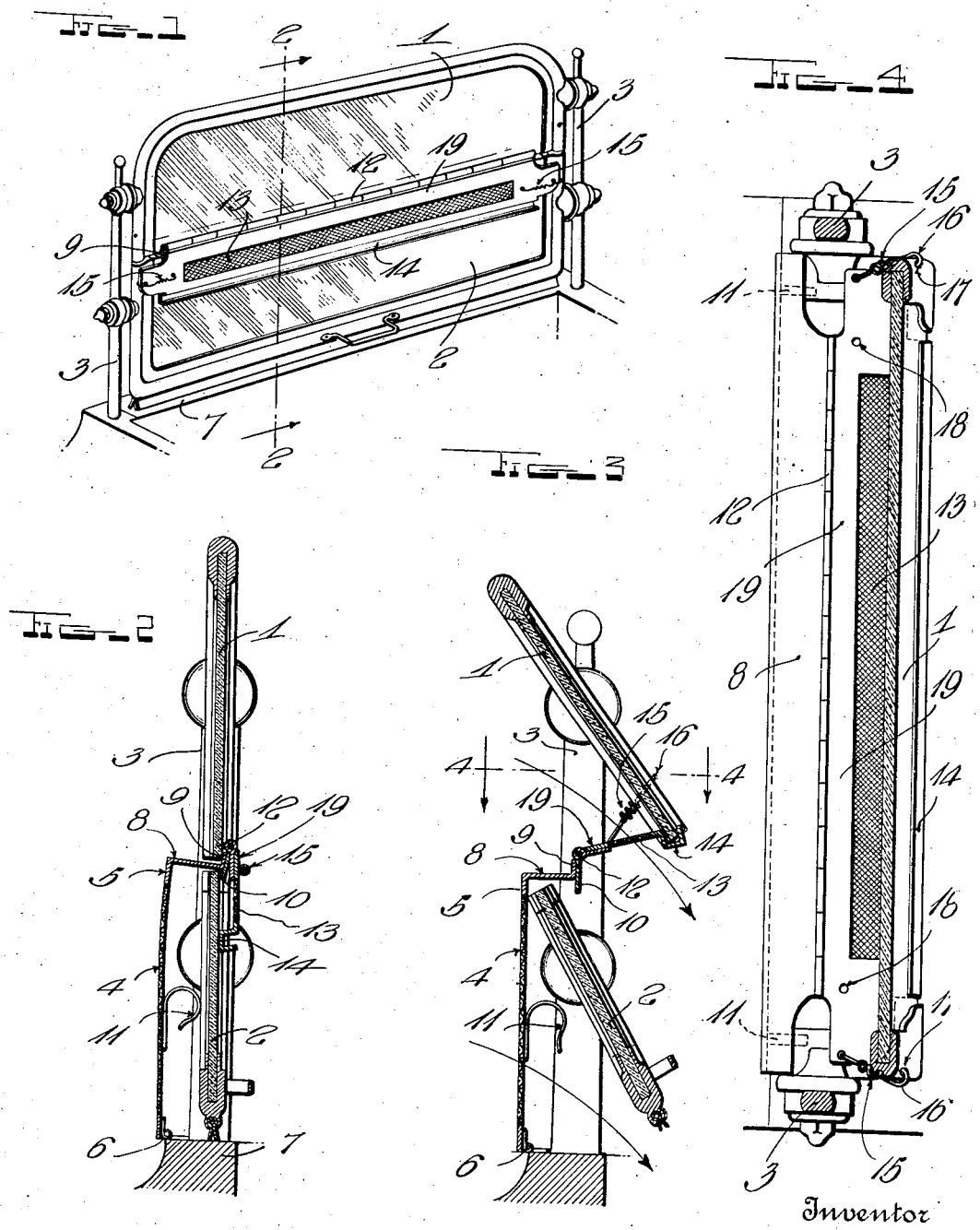

WILLIAM B. HERBST, OF COLUMBUS, INDIANA.

WINDSHIELD-SCREEN.

1,337,472.  Specification of Letters Patent.  Patented Apr. 20, 1920.

Application filed February 6, 1919. Serial No. 275,335.

*To all whom it may concern:*

Be it known that I, WILLIAM B. HERBST, a citizen of the United States, residing at Columbus, in the county of Bartholomew and State of Indiana, have invented certain new and useful Improvements in Windshield-Screens; and I do declare the following to be a full, clear, and exact description of the invention, such as will enable others skilled in the art to which it appertains to make and use the same.

My invention relates to improvements in screens for automobile windshields and has for its object to provide a simple and easily applied device capable of screening the space between the upper and lower windshield sections when the upper section is swung rearwardly and also serving to prevent the entrance of foreign matter when the lower section is swung rearwardly, the arrangement of parts being such as to allow both sections to be closed when required and to prevent rain from driving in between said sections.

With the foregoing in view, the invention resides in the novel features of construction and unique association of parts hereinafter fully described and claimed, and illustrated in the accompanying drawings.

Figure 1 is a perspective view of the invention with the two sections of the windshield closed.

Fig. 2 is a vertical section on the plane indicated by the line 2—2 of Fig. 1.

Fig. 3 is a view similar to Fig. 2 but disclosing the manner in which the screen is adjusted when the windshield is opened.

Fig. 4 is a horizontal section on the plane indicated by the line 4—4 of Fig. 3.

In the drawing above briefly described, the numerals 1 and 2 designate respectively the upper and lower pivotally mounted sections of a common form of windshield, said sections being supported by the standards 3 which form part of the windshield frame. Spaced in advance of the lower section 2 is a screen 4 having a metal frame 5 which is hinged at 6 to the lower end 7 of the windshield frame. The upper edge of the screen 4 is provided with a rearwardly extending flange 8 passing over the upper edge of the lower shield section 2 and having its rear edge turned upwardly at 9 to prevent the entrance of rain between the two windshield sections when closed as in Fig. 2. Any preferred form of stop means 10 may depend from the rear edge of the flange 8 for contact with the shield section 2, and suitable springs 11 are carried by the rear side of the screen frame 5 to bear against said section 2, so that said stops will be held by spring action against the upper edge of this section, thus positively preventing rattling when the parts stand as in Fig. 2 or whenever the lower section 2 is closed.

Hinged at 12 to the upper edge of the flange 9, is an auxiliary screen 13 which, when the windshield is closed, depends in rear of the lower section 2 as illustrated in Figs. 1 and 2. When the upper section 1 is swung rearwardly as in Fig. 3, however, the screen 13 is adapted to extend to the lower edge thereof as shown in this figure, the free edge of the screen in question having a channel-shaped formation 14 adapted to receive the lower edge of section 1. Coiled springs 15 or other elastic devices are attached to the ends of the screen 13 and have hooks 16 on their free ends adapted to engage openings or the like 17 in the frame of the upper section 1, and by this means, said section and the screen 13 are held in operative relation. When the screen 13 is not in use, the hooks 16 may engage openings 18 in the frame 19 of said screen as shown in Fig. 1.

In order to move the parts from the position of Figs. 1 and 2 to that of Fig. 3, it is necessary first, to swing the upper section 1 forwardly; second, to swing the lower section 2 rearwardly; third, to swing the entire screen device forwardly on the hinges 6; fourth, to swing the section 1 rearwardly as in Fig. 3; fifth, to engage the channel 14 with the lower edge of said section; and sixth, to hook the springs 15 in place. Either section of the shield may now be adjusted as required and the screen 13 will at all times prevent the entrance of foreign matter between the two sections while screen 4 will exclude any such matter which would otherwise enter below the section 2. When the windshield is to be closed, a reversal of the operations above described is necessary, and the screen 13 will then hang in rear of the section 2 while the rattling of the screen 4 is prevented by the action of the springs 11. These springs may be of such tension as to cause slight bowing of the screen as seen in Fig. 2, but this is not essential. In heavy storms, the springs 11 permit the screen 4 to yield rearwardly against the lower windshield section so that there is no danger of the screen being torn from the frame.

The device is rather simple and inexpensive, may be easily attached, permits free adjustment of both sections of the windshield, while at all times excluding insects, bugs, and all forms of foreign matter commonly encountered on the road, and it is to be observed that the upper windshield section is entirely unobstructed so that free vision may be had. I attach great importance to these characteristics and also to the fact that the hinged arrangement shown allows the screen to be swung out onto the hood of the machine when cleaning either the screen or windshield.

Since probably the best results are obtained from the details disclosed, they may well be followed, but within the scope of the invention as claimed, numerous minor changes may well be made and the device may be adapted to any of the several forms of automobiles.

What I claim as my invention is:—

1. The combination with an automobile windshield including upper and lower swinging sections, of a screen in front of said lower section to prevent the entrance of foreign matter when said lower section is opened, an additional screen carried by the upper edge of said first named screen to extend between the two sections of the shield when said upper section is opened, and means for securing said additional screen in operative position.

2. The combination with an automobile windshield including upper and lower swinging sections, of a screen in front of said lower section to prevent the entrance of foreign matter when said lower section is swung rearwardly, an additional screen hinged to the upper edge of said first named screen, said additional screen being normally folded downwardly adjacent said lower section and being adapted to swing upwardly to engage the lower edge of the upper shield section when the latter is opened, and means for retaining said additional screen in operative position.

3. The combination with an automobile windshield including upper and lower swinging sections, of a screen in front of said lower section to prevent the entrance of foreign matter when said lower section is swung rearwardly, an additional screen carried by the upper edge of said first named screen to extend between the two sections of the shield when the upper section is opened, an additional screen hinged to the upper edge of said first named screen, said additional screen being normally folded downwardly adjacent said lower section and being adapted to swing upwardly to engage the lower edge of the upper shield section when the latter is opened, the free edge of said additional screen having a channel to receive said lower edge of said upper shield section, and means for retaining said edge in said channel.

4. The combination with an automobile windshield including upper and lower swinging sections, of a screen in front of said lower section to prevent the entrance of foreign matter when said lower section is opened, an additional screen hinged to the upper edge of said first named screen; said additional screen being normally folded downwardly adjacent said lower section and being adapted to swing upwardly to engage the lower edge of the upper shield section when the latter is opened, means on the free edge of said additional screen to engage the lower edge of said upper shield section when the latter is opened, and elastic devices attached to said additional screen and adapted for connection with said upper shield section to retain said additional screen and section in engagement.

5. The combination with an automobile windshield including upper and lower swinging sections, of a screen in front of said lower section to prevent the entrance of foreign matter when said lower section is swung rearwardly, hinges connecting the lower edge of said screen with the lower end of the windshield frame, an additional screen hinged to the upper edge of said first named screen and normally folded downwardly adjacent said lower shield section, said additional screen being adapted to swing upwardly when said upper section is opened, and means for connecting said additional screen with said upper shield section.

6. The combination with a windshield including upper and lower swinging sections; of a screen in front of the lower section and hinged to the lower end of the windshield frame, a flange extending rearwardly from the upper edge of said screen over said lower section of the shield, an additional flange rising from the rear edge of said first named flange and adapted for disposition in rear of the upper windshield section to exclude water, an additional screen hinged to said additional flange and adapted to extend therefrom to the lower edge of the aforesaid upper section of the shield when the latter is opened, and means for connecting said additional screen and upper section in operative relation.

7. The combination with an automobile windshield including a lower rearwardly swinging section, and an upper section, of a screen spaced in front of said lower section and hinged at its lower edge to the lower end of the windshield frame, a flange on the upper edge of said screen extending rearwardly between the two windshield sections, an additional flange rising from said first mentioned flange for disposition in rear of said upper shield section to exclude water, stop means depending from one of said flanges and adapted to bear against the rear side of the lower shield section when the latter is closed, and spring means on the screen frame adapted to bear against said lower shield section and retain said stop means against said section, whereby to prevent rattling of the entire device.

8. The combination with an automobile windshield including upper and lower swinging sections; of a screen spaced in front of the lower section and hinged to the lower end of the windshield frame, a flange extending rearwardly from the upper end of said screen between the two sections, an additional flange rising from said first named flange and adapted for disposition in rear of the upper shield section to exclude water, stop means depending from one of said flanges and adapted to abut the lower shield section when the latter is closed, spring means carried by the aforesaid screen and adapted to abut said lower shield section to retain said stop means in engagement with the latter, an additional screen hinged to said additional flange and depending therefrom when the windshield is closed, said additional screen being adapted to swing upwardly and engage the lower edge of the upper shield section when the latter is swung rearwardly, and means for retaining said additional screen and said upper shield section in operative relation.

9. The combination with a windshield including upper and lower swinging sections; of a screen in front of the lower section, an additional screen hinged to the upper end of the aforesaid screen and adapted to extend to the lower edge of the upper shield section when the latter is opened, and means for connecting said additional screen and said upper shield section.

10. A windshield screen comprising a lower screen section for disposition in front of the lower windshield section, an upper screen section carried by the upper edge of said lower section and adapted to extend to the lower edge of the upper windshield section when the latter is opened, and means for connecting said upper screen section with the lower edge of the upper windshield section when the latter is open.

11. A windshield screen comprising a lower screen section for disposition in front of the lower windshield section, hinge means for connecting the lower end of said screen section with the lower end of the windshield frame, an upper screen section hinged to the upper end of said lower screen section and adapted to extend to the lower edge of the upper windshield section when the latter is opened, and means for fastening said upper screen section in operative position.

In testimony whereof I have hereunto set my hand.

WILLIAM B. HERBST.